June 28, 1966   G. W. HERTZSCHUCH ET AL   3,258,099
INSURANCE VENDING MACHINE OPERABLE BY BILLS OR COINS OR BY
COMBINATIONS OF BILLS AND COINS
Original Filed May 27, 1964   2 Sheets-Sheet 2
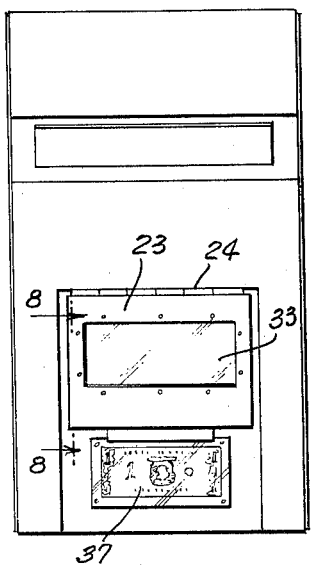
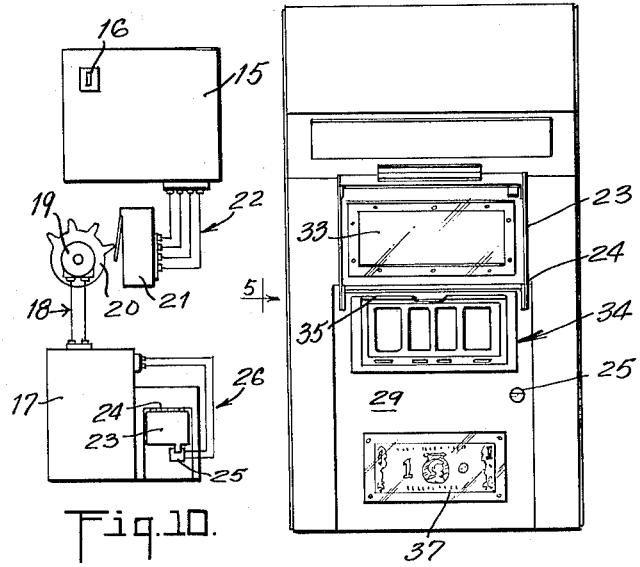
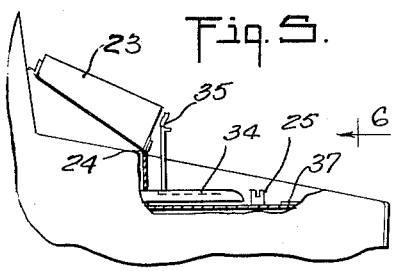
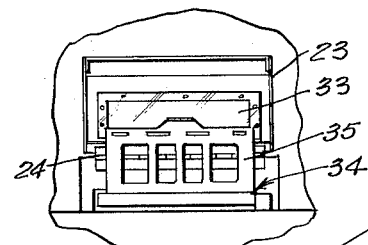
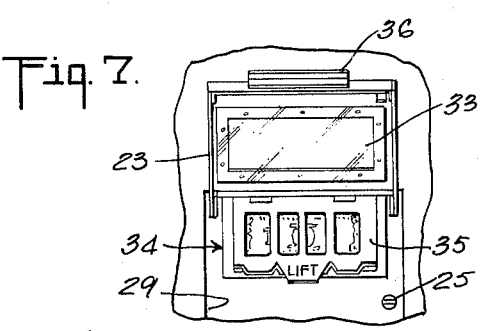
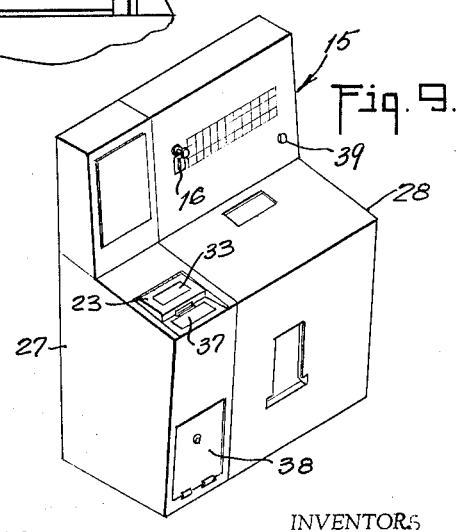
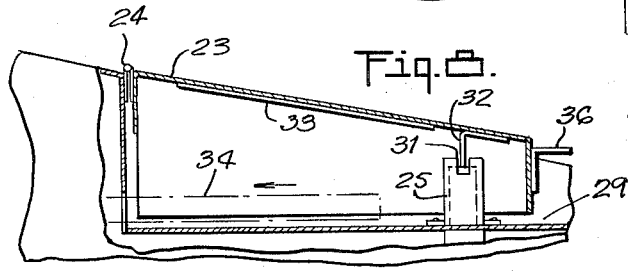
INVENTORS
GEORGE W. HERTZSCHUCH
ROBERT M. HOSKO
BY
ATTORNEY United States Patent Office 3,258,099
Patented June 28, 1966

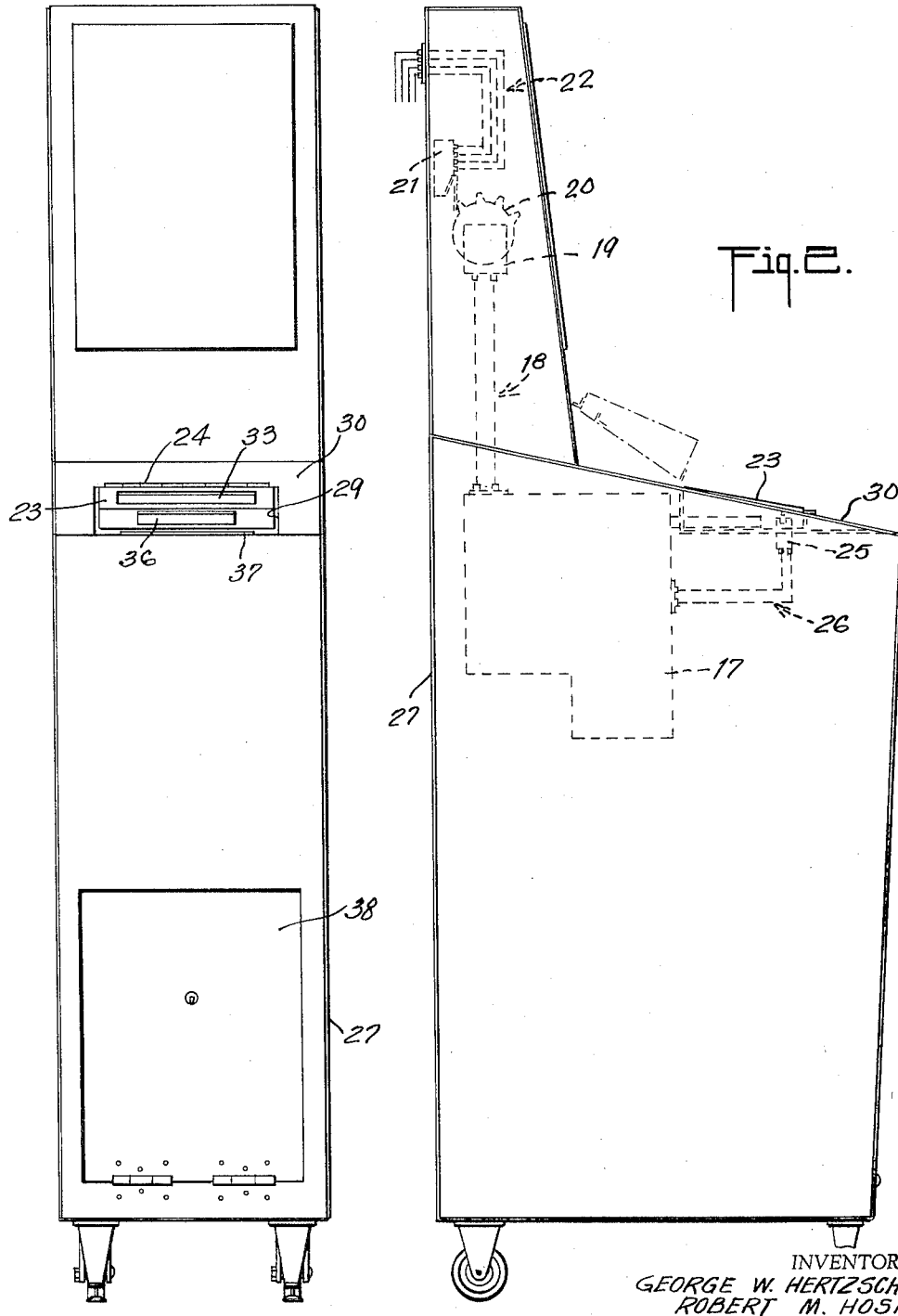

3,258,099
INSURANCE VENDING MACHINE OPERABLE BY BILLS OR COINS OR BY COMBINATIONS OF BILLS AND COINS
George W. Hertzschuch and Robert M. Hosko, both of Stroudsburg, Pa., assignors, by mesne assignments, to The Fidelity and Casualty Company of New York, New York, N.Y., a corporation of New York
Continuation of application Ser. No. 370,441, May 27, 1964. This application Sept. 22, 1965, Ser. No. 496,225
2 Claims. (Cl. 194—4)

The invention herein disclosed relates to insurace vending machines and this application for patent is a continuation of co-pending application Ser. No. 370,441, filed May 27, 1964, now abandoned.

The general purposes of the invention are to provide a vending machine which will operate either on coins or on paper currency having the equivalent value of such coins, or additionally, on various combinations of bills and coins.

Special objects of the invention are to provide a machine of such capabilities, of relatively simple construction and reasonable cost and which can be made up using components of accepted established reliability.

In a practical embodiment of the invention, an insurance vending unit of approved design is combined with a dollar bill acceptance unit of approved construction, connected with the vending mechanism through a control switch which upon satisfactory signal from the acceptance unit will put the vending mechanism through the successive stages required to issue the policy of selected value.

A special feature of the invention is the provision of a cover on the acceptor which must be opened to place the paper money in the acceptor and which when closed to protect the inserted money will operate to start the acceptor on its inspection cycle.

Other desirable objects accomplished by the invention and novel features through which the purposes of the invention are effected are set forth and will appear in the course of the following specification.

The drawings accompanying and forming part of the specification are illustrative of a present practical commercial embodiment of the invention.

Structure, however, may be modified and changed as regards the immediate illustration; all within the true intent and scope of the invention as hereinafter defined and claimed.

FIG. 1 in the drawings is a front elevation of the acceptor portion of the machine consisting in this instance of a cabinet containing the acceptor mechanism and adapted to be coupled into side by side engagement with the cabinet portion containing the vending machine, substantially as shown in FIG. 9.

FIG. 2 is a side elevation of the acceptor unit showing the protective cover over the acceptor in full lines in closed position and in broken lines, open for placing of a dollar bill in the holder provided to receive it.

FIG. 3 is a top plan view of the acceptor unit, on a smaller scale, with the protective cover down in closed position.

FIG. 4 is a similar plan view showing the protective cover lifted to expose the bill holder and the latter opened to receive the paper currency.

FIG. 5 is a broken part sectional detail looking in the direction of the arrow 5 in FIG. 4 and showing both the cover and the grid of the bill holder lifted for insertion of the dollar bill.

FIG. 6 is a broken front view looking in the direction of the arrow 6 in FIG. 5.

FIG. 7 is a broken plan view showing a dollar bill inserted in the holder and the cover ready to be closed to start the inspection and policy delivering operations.

FIG. 8 is an enlarged broken sectional detail on substantially the plane of line 8—8 of FIG. 3 showing the protective cover closed and ready to be depressed to start the acceptor.

FIG. 9 is a perspective view of the complete apparatus involving the bill acceptor combined with the policy vending machine.

FIG. 10 is a schematic diagram showing how closing the protective cover over the inserted bill closes a switch to start the acceptor and which latter, if the bill is accepted, activates a motor driven switch connected to activate the vending machine for issuing a policy of the value purchased by the dollar bill.

In the diagrammatic view, FIG. 10, a coin controlled insurance vending machine is indicated at 15.

This may be of a more or less standard, established design, such as the machine manufactured by the Oiljak Manufacturing Co., Incorporated, of Stroudsburg, Pennsylvania, under U.S. Patent 2,915,965 of December 8, 1959, operated as more or less customary by deposit of quarters in a coin chute 16, a quite usual practice being to deposit four or eight such coins in succession to acquire policies of generally desired values.

In this view, a dollar bill acceptor of approved design is indicated at 17.

This may be one of the type furnished by Telrad Corp., subsidary of the Lionel Corp., of New York City with their change making machines and involving a cage-like holder for a dollar bill, arranged upon receipt of a bill to withdraw and subject the bill to inspection and then, if satisfactory, to initiate further operation, identified as No. SP–860–1 Dollar Bill Senser.

Further operations in the present instance consist in energizing, through connections 18, a small switch operating motor 19 having a four point cam 20 for operating a switch 21 in four successive steps corresponding in timing and effect to the dropping of the four coins in the vending machine.

The timing switch 21 is shown as connected with the vending machine by connections 22 which are extended to the relays or other such elements in the vending machine normally governed by the coin drop switch.

The protective cover over the bill holder is indicated at 23 in FIG. 10, hinged at 24, so that it may be lifted to expose the bill holder for reception of a bill and then closed to operate a switch 25, connected at 26, to start the acceptor.

A special feature of the present invention is that the acceptor, with the protective cover, and timing switch are all combined in a single unit designed to be combined and coupled directly to existing insurance vending machines.

This feature is illustrated in FIG. 9 where the acceptor unit is all embodied in a unitary cabinet structure 27 of the same general shape and directly applied over the end of the cabinet 28 embodying and incorporating the insurance vending mechanism.

In practice the cabinet of the acceptor mechanism is constructed so that it can be directly bolted to either end of the vending machine cabinet, FIGS. 1 and 2 show how the acceptor cabinet 27 may be made relatively narrow so as not to add objectionable bulk to the end of the vending machine cabinet 28 and show the protective cover 23 located in a well 29 in the slanting desk-like top 30 of the cabinet.

The starter switch 25 is shown as positioned beneath the cover and as having a notch 31 in the top of the same to admit a dependent switch operating projection 32, FIG. 8, on the underside of the cover.

The protective cover is preferably provided with a transparent window 33 so that the user may see and observe the operation of the holder 34 in which the bill has been placed.

The bill holder 34 in the machine identified, usually stands in projected position as shown in FIG. 5, ready to receive a dollar bill when the hinged bill confining grid 35 is lifted as in FIGS. 5 and 6.

Then when the grid 35 is lowered to hold the bill in place, as in FIG. 7, and the cover 23 closed down over the inserted bill, as in FIG. 8, downward pressure on handle 36 will cause the cover to close the starter switch 25, whereupon the acceptor will withdraw the bill holder 34 into the inspection chamber of the acceptor and then if the bill is accepted and dropped by the holder into the receiving compartment, return the holder back to exposed position ready for the next operation.

To assist and instruct users of the machine, an illustration of the dollar bill is framed at 37, FIGS. 3, 4 and 9, in front of the cover showing how the bill is to be placed face up in the holder for proper inspection and identification in the acceptor.

A securely locked door 38 is shown provided in the front of the acceptor cabinet providing access of duly authorized agents to the compartment in the bottom of the cabinet for holding the collected bills.

The invention provides a practical and convenient way for operating insurance vending machines to obtain the most popular forms of insurance policies, those requiring the premium of one or more dollars, without the necessity of obtaining the number of quarters required for such values.

The invention further leaves the machine free to be operated by one or more coins in the usual way and to be operated by one or more dollar bills and one or more coins up to the maximum amount allowed by the machine.

Furthermore, the operations are readily understood by users of these machines, it only being necessary to put in the amounts required by the instructions usually provided on these machines and then after filling out the required form, to press the button 39, FIG. 9, reserved for final delivery of the policy.

The invention provides both a coin controlled machine which may be operated in the usual way to dispense insurance policies of selected values and a machine which will inspect paper currency and then if such currency is accepted as genuine, deliver policies of the value represented by such paper currency.

The invention enables a typical or conventional insurance vending machine operable by coins being converted to operation by a monetary bill of equal value to the coins, by means of a compact readily attachable unit having means for ascertaining validity and accepting genuine currency and timing means connectible to the coin drop of the vending machine and operable to impart impulses to the coin drop corresponding to the number of coins which the paper currency may represent in value.

This conversion unit does not interfere with the operation of the coin controlled vendor in the way it has normally been operated and may be made up as here shown in a form for attachment to any of the usual such vending machines.

Making up the acceptor and control mechanism as a separate unit has the further advantages in matters of servicing, repair and replacement of parts.

In particular, if a fault develops in the dollar bill acceptance unit, the faulty unit may be replaced without losing the use of the insurance policy unit.

If found desirable, however, for manufacturing or other reasons, the several components including the vending machine, bill acceptor, controlling connections between the two and the safety cover for starting operation may all be combined in one compact unit.

What is claimed is:

1. An insurance vending machine for issuing insurance policies for amounts determined by the number of coins or bills or combinations of bills and coins accepted by the machine and comprising coin controlled insurance vending mechanism having means for actuating the same to a definite value for each coin of a certain value deposited therein, enabling the total amount of a policy to be determined by the number of such coins deposited therein, a bill acceptor for detecting valid currency from counterfeit, said bill acceptor being disposed in closely adjoining relation to said insurance vending mechanism and including a holder for a bill having a value corresponding to that of a definite number of said coins of certain value, a timing switch connected to actuate such vending mechanism, and motor driven operating means for said timing switch having a cam with cam points of the same number as said definite number of certain value coins, connected to be actuated by said bill acceptor, said cam actuating said timing switch to actuate said vending mechanism to the same extent as actuated by such definite number of coins.

2. The invention according to claim 1 in which said bill acceptor has a movable cover for confining a bill in said holder and in which said timing switch mechanism is connected to be actuated by said bill acceptor by means including a switch operable by said cover and connected to initiate operation of said bill acceptor, and whereby on acceptance of a bill of said definite value and closing of said acceptor cover, said vending mechanism will be actuated in the same timed relation as effected by the deposit of the number of said coins equalling the value of the accepted bill.

References Cited by the Examiner

UNITED STATES PATENTS 3,186,531   6/1965   Adams _____ 194—4
3,191,737   6/1965   James et al. _____ 194—4

RAPHAEL M. LUPO, *Primary Examiner.*

S. H. TOLLBERG, *Assistant Examiner.*